(12) United States Patent
Cannon

(10) Patent No.: US 6,182,608 B1
(45) Date of Patent: Feb. 6, 2001

(54) HEAT REMOVAL AND RECOVERY SYSTEM FOR INCUBATORS AND HATCHERS

(76) Inventor: Robert W. Cannon, 6565 Joseph St. NE., Salem, OR (US) 97301

( * ) Notice: Under 35 U.S.C. 154(b), the term of this patent shall be extended for 0 days.

(21) Appl. No.: 09/305,878

(22) Filed: May 5, 1999

(51) Int. Cl.$^7$ .......................... A01K 31/20; A01K 41/02
(52) U.S. Cl. ............................................. 119/300; 119/306
(58) Field of Search .................................. 119/300, 304, 119/305, 306, 315, 316, 317; 165/53, 54

(56) References Cited

U.S. PATENT DOCUMENTS

| | | |
|---|---|---|
| 324,274 | 8/1885 | Rosebrook . |
| 702,780 | 6/1902 | Darling . |
| 787,671 | 4/1905 | Jacobson . |
| 846,865 | 3/1907 | Rogers . |
| 914,171 | 3/1909 | Nicholls . |
| 1,345,483 | 7/1920 | Ewry . |
| 1,361,038 | 12/1920 | Flickinger . |
| 1,489,597 | 4/1924 | Hillpot . |
| 1,496,650 | 6/1924 | Reinsperg . |
| 1,545,425 | 7/1925 | Hillpot . |
| 1,573,038 | 2/1926 | Branington . |
| 1,759,515 | 5/1930 | Maneval . |
| 1,781,336 | 11/1930 | Marshall . |
| 1,927,994 | 9/1933 | Rackstraw . |
| 1,952,599 | 3/1934 | McKay . |
| 2,026,801 | 1/1936 | Ross . |
| 2,074,190 | 3/1937 | Robbins . |
| 2,137,769 | 11/1938 | Crawford . |
| 2,193,370 | 3/1940 | Kocher . |
| 2,296,930 | 9/1942 | Ihler . |
| 2,437,719 | 4/1948 | Crawford . |
| 2,646,930 | 7/1953 | Dryden . |
| 2,793,581 | 5/1957 | Cannon . |
| 2,887,090 | 5/1959 | Cannon . |
| 2,997,021 | 8/1961 | Bailey . |
| 3,470,851 | 10/1969 | Cannon . |
| 3,489,124 | 1/1970 | Cannon . |
| 3,797,172 | 3/1974 | Cannon . |
| 3,820,507 | 6/1974 | Dugan et al. . |
| 3,854,452 | 12/1974 | Bardet . |
| 3,923,006 | 12/1975 | Dugan et al. . |
| 4,005,679 | * 2/1977 | Pas ........................................ 119/300 |
| 4,171,770 | 10/1979 | Mailander . |
| 4,274,364 | 6/1981 | Forseth . |
| 4,316,552 | 2/1982 | Hurley, III . |
| 4,490,311 | 12/1984 | Shepard . |
| 4,708,197 | 11/1987 | Robbins . |
| 4,993,484 | 2/1991 | Neuzil . |
| 5,025,619 | 6/1991 | Cannon . |
| 5,123,595 | 6/1992 | Doss . |
| 5,226,385 | * 7/1993 | Cannon ................................ 119/300 |

FOREIGN PATENT DOCUMENTS 897188  1/1982  (RU) .

* cited by examiner

Primary Examiner—Michael J. Carone
Assistant Examiner—Elizabeth Shaw
(74) Attorney, Agent, or Firm—Marger Johnson & McCollom, PC

(57) ABSTRACT

An apparatus for removing heat caused by living embryos within an insulated hatchery enclosure. The apparatus comprises an enclosed chamber bounded by two pairs of opposing side walls and opposing first and second end walls spanning the insulated hatchery enclosure. The first end wall has a heat conductive portion, such as a copper plate, adapted to conduct heat between an outer surface of the end wall facing an interior of the insulated enclosure and an inner surface of the end wall adjacent the enclosed chamber. A plurality of baffles within the chamber define a serpentine path within the chamber through which air is directed from a start position along the path to an end position. A fresh air inlet coupled to the start position communicates fresh air taken from outside the insulated enclosure into the chamber and then through the serpentine path. An exhaust air outlet coupled to the end position communicates air that has flowed through the serpentine path away from the chamber and out of the insulated enclosure.

15 Claims, 6 Drawing Sheets

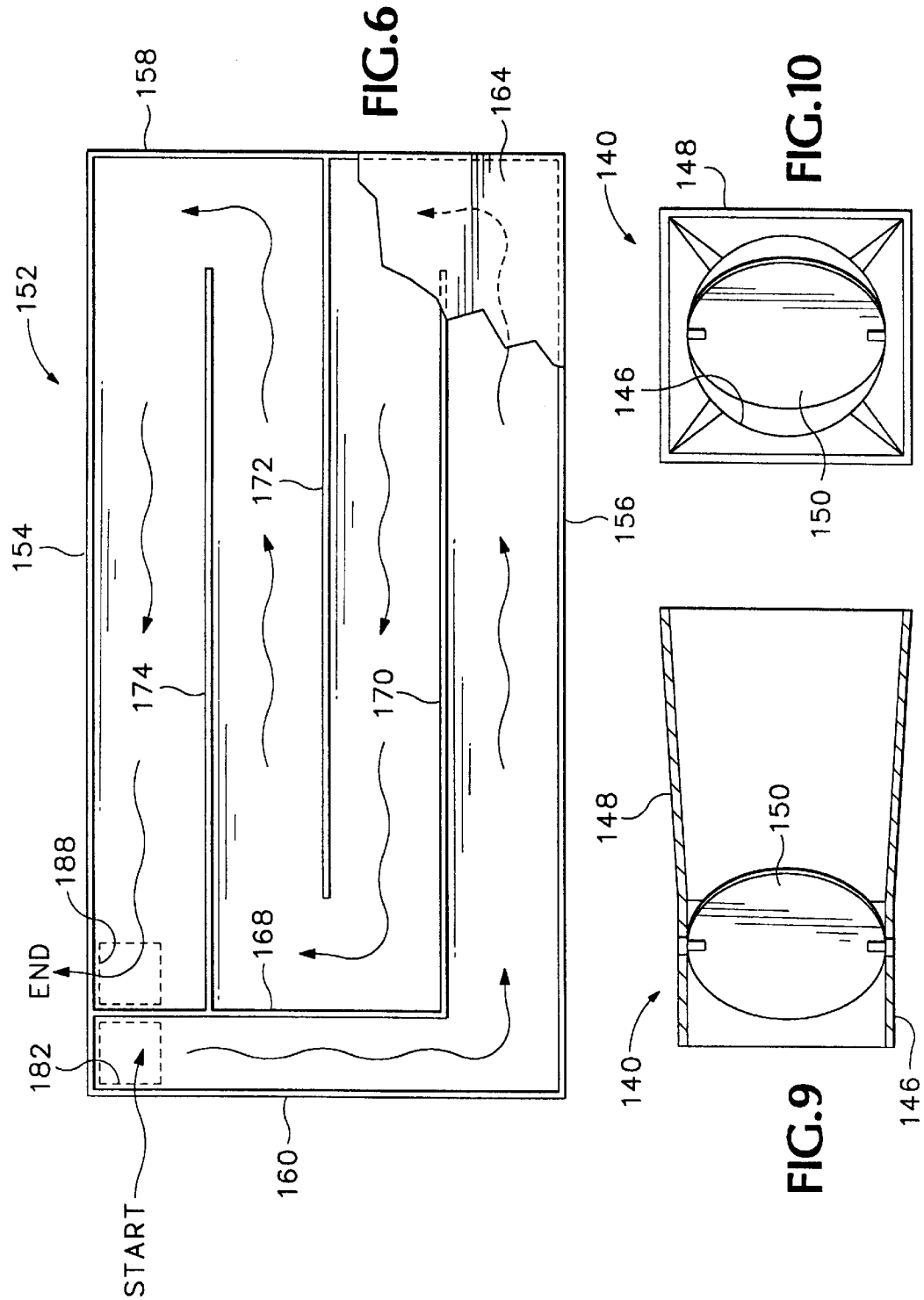

HEAT REMOVAL AND RECOVERY SYSTEM FOR INCUBATORS AND HATCHERS

BACKGROUND OF THE INVENTION

1. Field of the Invention

The present invention relates to methods and apparatus for incubating and hatching eggs and more particularly to such methods and apparatus in which heat generated from living embryos and built up in an enclosed environment is transferred out of the environment so that optimum conditions can be maintained.

2. Description of the Related Art

Egg hatcheries in which environmental conditions are controlled to optimize the number of hatched eggs and/or properly maintain hatched chicks are known in the art. The primary concerns for operating an incubator or hatchery are maintaining the ambient air around the incubator/hatchery chamber at an optimum temperature of 70° F. and temperatures within the chamber of around 99° F. Other concerns include maintaining the proper humidity and mixture of gases within the hatchery chamber. Unfortunately, living embryos within the incubator or hatcher produce heat that interferes with the careful environmental equilibrium established in the enclosed system. Accordingly, environmental control apparatuses have been developed especially for the hatchery/incubator market in response to these concerns.

One of the most successful designs is described in applicant's own U.S. Pat. No. 5,025,619 in which hot and cold water are circulated through coils under the control of microprocessor means responsive to conditions within the hatchery chamber to either raise or lower the temperature for optimum conditions. Heat is exchanged between the ambient air and the water filled coils thus regulating the temperature of the chamber.

Water-based heating and cooling systems, including applicant's own, have several drawbacks. It has been found, for instance, that the efficiency of this system is reduced over time by the build-up on all exposed surfaces of down from chick feathers. This is especially pronounced on the cool water coils where down sticks to the condensate formed on the coils. A by-product of this phenomenon makes the coils drip, thus causing wet floors and wet down which can harbor bacteria. Additionally, water-based cooling systems tend to dry out the air within the chamber thus forming the need for a separate humidity control device within the chamber. Finally, such systems tend to be complicated, expensive, and difficult to recover wasted heat.

Air has been used as a medium for temperature control but this has been primarily limited to simply dumping quantities of cooled or heated air into the hatchery/incubator chamber. This has the drawback of changing the gas mixture within the chamber which is bad for the newly hatching chicks.

Accordingly, a need remains for an improved system for regulating the temperature within a hatchery/incubator chamber that avoids the drawbacks of the prior art.

SUMMARY OF THE INVENTION

It is, therefore, an object of the invention to provide a system that can be incorporated into a hatchery much cheaper that a closed circuit water system.

Another object of the invention is to provide a heat exchange system that reduces the chance for condensation and thus is much easier to clean and keep in a sanitary condition.

A further object of the invention is to provide a system whose efficiency is maintained over time.

The invention is an apparatus for removing heat caused by living embryos within an insulated enclosure. The apparatus comprises an enclosed chamber bounded by two pairs of opposing side walls and opposing first and second end walls spanning the insulated enclosure. The first end wall has a heat conductive portion, such as a copper plate, adapted to conduct heat between an outer surface of the end wall facing an interior of the insulated enclosure and an inner surface of the end wall adjacent the enclosed chamber. A plurality of baffles within the chamber define a serpentine path within the chamber through which air is directed from a start position along the path to an end position. A fresh air inlet coupled to the start position communicates fresh air taken from outside the insulated enclosure into the chamber and then through the serpentine path. An exhaust air outlet coupled to the end position communicates air that has flowed through the serpentine path away from the chamber and out of the insulated enclosure.

The heat removal apparatus operates by exposing the outer surface of the first end wall to the interior of the insulated enclosure. Heat generated from living embryos raised within the insulated enclosure warms the air within the enclosure, which heats the exposed end wall of the heat removal apparatus. The heat is conducted to the inner surface of the end wall. Air passing within the chamber along the serpentine path is heated by its proximity to the now-heated inner surface of the end wall as it passes from the start position to the end position. The heated air is then exhausted from the heat removal apparatus.

The air-based heat removal system constructed according to the teachings of the present invention has several advantages over prior art water-based systems. First, it can be incorporated into a hatchery must more cheaply than a closed circuit water system and it does not present as difficult or expensive a problem in recovering waste heat. Second, the invention is a closed system relative to the hatchery enclosure thus eliminating the problems associated with cooling the hatchery by dumping refrigerated air into the hatchery chamber. Third, the condensation problems associated with water-based systems is substantially eliminated. Down is thus less likely to stick to the exterior surfaces of the system thus maintaining the efficiency of the device over time. Finally, the present system can be easily retrofitted to older hatcheries and work in conjunction with existing machines.

The foregoing and other objects, features and advantages of the invention will become more readily apparent from the following detailed description of a preferred embodiment of the invention that proceeds with reference to the accompanying drawings.

BRIEF DESCRIPTION OF THE DRAWINGS

FIG. 6 is an elevation view of the wall-mounted panel of FIG. 5 shown partially in section.

FIG. 9 is a partial section, side elevation view of the air exhaust duct used in the units of FIGS. 3 and 5.

FIG. 10 is a front elevation view of the air exhaust duct of FIG. 9.

DETAILED DESCRIPTION

Figure 1:
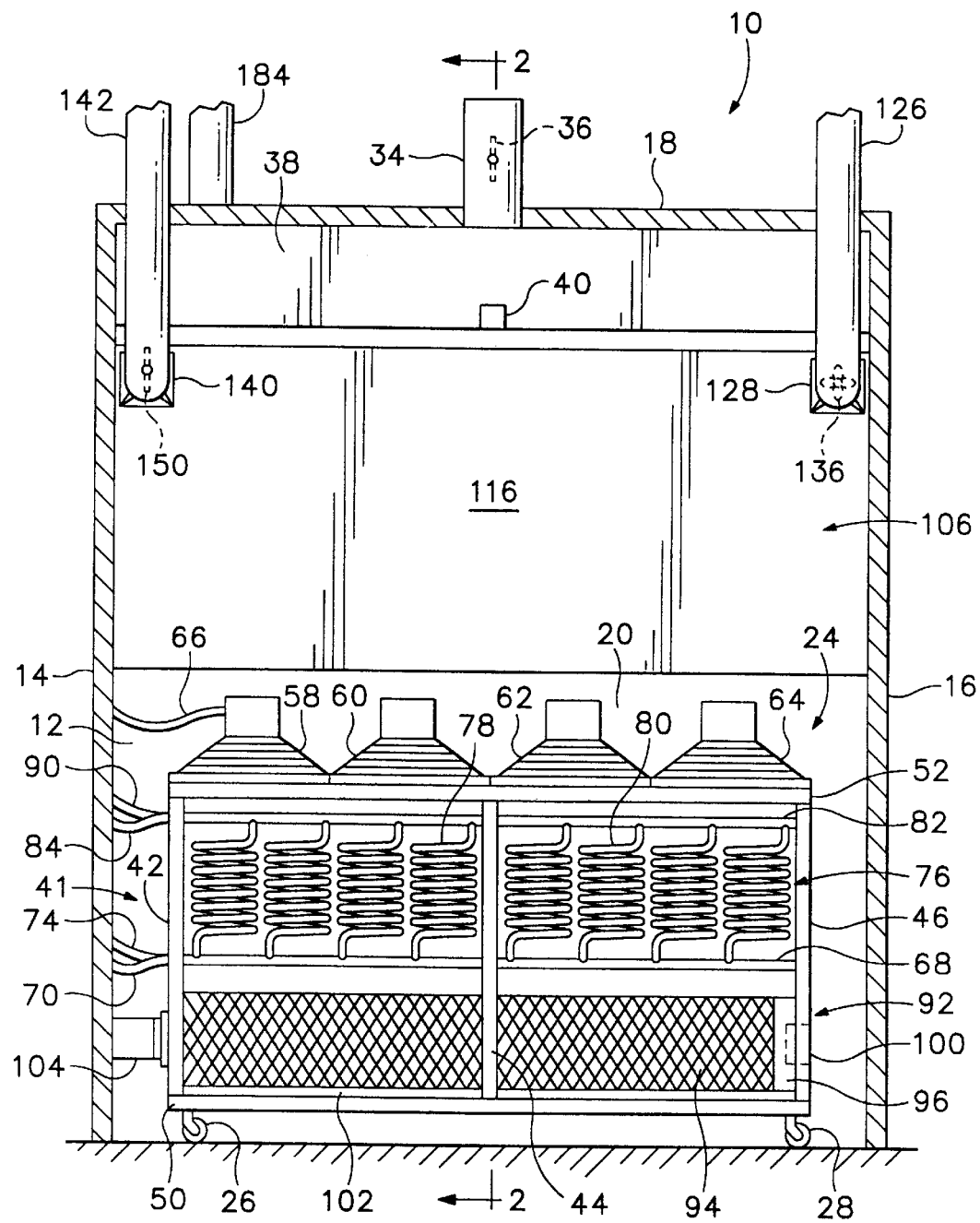
FIG. 1 is an elevation view of a hatchery chamber shown partially in section with environmental control means constructed according to a preferred embodiment of the invention.

Indicated generally at 10 is an incubator constructed in accordance with the present invention. The incubator 10 includes an incubation chamber 12 which is defined by four walls, two of which are opposing walls 14, 16 and a ceiling 18. An inner surface 20 of one of the walls, wall 22 (FIG. 2), is viewable in FIG. 1. The walls and ceiling are made of a fiber plastic resin containing foam insulation material. Access to the chamber is through a door (not shown) which is preferably like that shown in U.S. Pat. No. 3,797,172 for a rollaway door, which patent is assigned to the assignee of the present invention.

Figure 2:
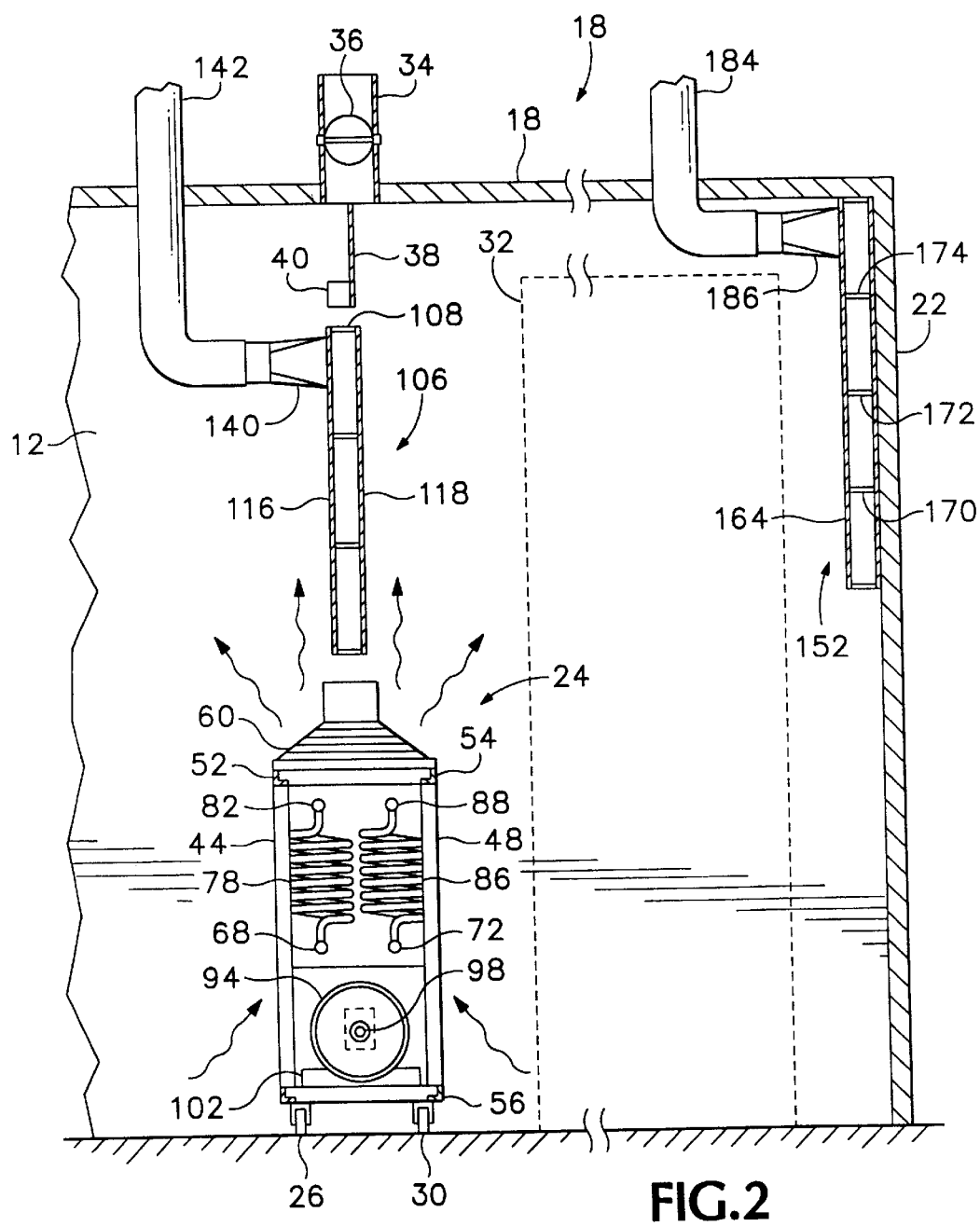
FIG. 2 is a partial cross section taken along line 2—2 in FIG. 1.

An air control unit, indicated generally at 24, is rollably mounted on wheels, three of which are wheels 26, 28, 30. Although not illustrated in detail herein, a pair of rollable racks, one of which is designated by dashed outline 32 in FIG. 2, are positioned on either side of air control unit 24 as viewed in FIG. 2. Each of the racks includes a plurality of trays on which a plurality of eggs are incubated and hatched.

Generally speaking, air control unit 24 helps control the temperature, relative humidity and air circulation in incubation chamber 12 during the incubation and hatching of the eggs in racks. Such control is responsive to a microprocessor-based system such as the one described in applicants U.S. Pat. No. 5,025,619 for a method and apparatus for incubating and hatching eggs, which is incorporated herein for all purposes.

Continuing with a detailed description of the structure illustrated in FIGS. 1 and 2, a vent pipe 34 is centrally located in ceiling 18 and provides communication between the interior of chamber 12 and the exterior thereof. A commercially available motor-powered damper 36 is mounted on vent pipe 34 in the usual manner. A motor (not shown) is drivable to set damper 36 between a first position, which shuts off air flow in vent pipe 34, and a second position which substantially completely opens the vent pipe. Damper 36 is illustrated in its second position.

A divider 38 extends between chamber walls 14, 16 and extends downwardly from ceiling 18 to form an air flow barrier.

A removable sensing unit 40 is mounted on divider 38 and contains commercially available air temperature relative humidity and carbon dioxide sensors for monitoring the environment chamber 12. The sensors are incorporated into the microprocessor-based control system as described in the '619 patent.

Air control unit 24 includes a frame, indicated generally at 41, having a plurality of upright members 42, 44, 46, 48. Frame members 42, 44, 46 are connected at their upper and lower ends by horizontal frame members 50, 52. Vertical frame members 44, 48 are connected at their upper and lower ends by horizontal frame members 54, 56, respectively. Fans 58, 60, 62, 64 are mounted on the uppermost portion of frame 41 and are oriented to circulate air from the bottom of the incubator chamber to the top thereof as illustrated by the arrows in FIG. 2. A detachable electric cord 66 connects the fans to a source of electrical power (not shown).

A hot water manifold 68 is mounted on frame 41 and is in fluid communication with a disconnectable flexible hose 70. Hose 70 is in turn connected, via a control valve (not shown in FIGS. 1 or 2), to a water heating unit (also not shown). A second hot water manifold 72 (in FIG. 2) is likewise mounted on frame 41 in parallel spaced relationship to manifold 68. Manifold 72 is connected to a disconnectable flexible hose 74 which in turn is connected, via a control valve (not shown in FIGS. 1 or 2), to the water heating unit.

Manifolds 68, 72 are connected to heat exchanger indicated generally at 76. Heat exchanger 76 comprises a plurality of coils, like coils 78, 80, which form a first bank of coils that are in fluid communication with either manifold 68, or with manifold 72, at the lower ends thereof. There is a coil behind each coil visible in FIG. 1 which defines a second bank of coils with coil 86, in FIG. 2, being the only one visible.

Each of the coils in heat exchanger 76 which is connected to hot water manifold 68 at the lower end thereof has its upper end connected to a hot water return pipe 82. Pipe 82 is mounted on frame 41 and is in fluid communication with a disconnectable flexible hose 84 which is connected to the hot water heating unit (not shown), which heats the water and recirculates it to manifold 68 via hose 70.

Each of the coils in heat exchanger 76 which is connected to hot water manifold 72 at the lower end thereof has its upper end connected to a hot water return pipe 88. A disconnectable flexible hose 90 is in fluid communication with hot water return pipe 88 and is also connected to the hot water heating unit (not shown), for recirculation of heater water to the hot water manifold via hose 74.

Though not necessary for the operation of the invention, indicated generally at 92 is what is referred to herein as a humidifier or humidifying means. The humidifier includes a tubular element 94 having a plurality of diamond-openings, best viewed in FIG. 1, formed therein. In the instant embodiment of the invention, tubular element 94 is made from heavy-duty screen which is formed in the shape of a cylinder. Element 94 includes a pair of opposing end pieces, one of which is end piece 96 in FIG. 1, which are fixedly connected to the tubular element and to a central shaft 98 which is journaled on frame 41 for rotation about the axis thereof. An electric motor 100 (in FIG. 1) is mounted on frame 41 at one end of the tubular element for rotating shaft 98. A water pan 102 is mounted on frame 41 beneath tubular element 94 and is filled with water. The pan includes a float valve (not visible) which is connected to a source of water (also not visible) for maintaining a preselected water level in the pan. As best viewed in FIG. 2, tubular element 94 extends into pan 102 beneath the preselected water level.

A disconnectable hose 104, such being also referred to herein as communicating means, provides communication between the exterior of chamber 12 and the interior of tubular element 94.

Figure 3:
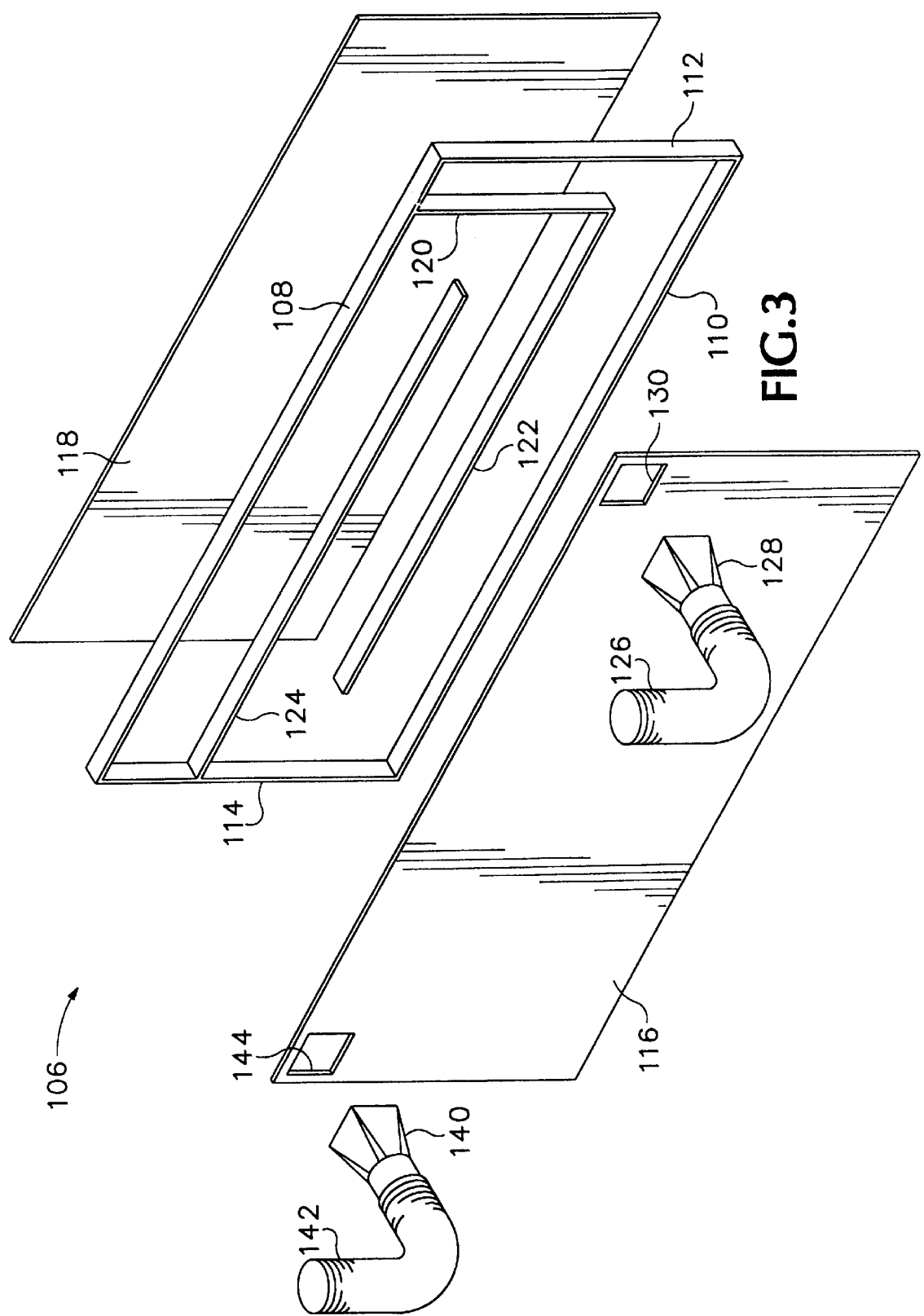
FIG. 3 is an exploded view of a center-mounted heat removal and recovery unit constructed according to a preferred embodiment of the invention.

FIG. 3 illustrates a heat exchanger apparatus at 106 constructed according to a preferred embodiment of the invention. Exchanger 106 comprises an enclosed chamber bounded by two pairs of opposing side walls, such as walls 108, 110, 112, 114, and an opposing first end wall 116 and second end wall 118. The walls are secured together using such means as metal screws or rivets, Superflex®, silicon-based adhesive and a sealant. To maximize the efficiency with which exchanger 106 removes unwanted heat from the hatchery, end walls 116, 118 are sized to substantially span the insulated hatchery enclosure 12 as shown in FIG. 1. At least one of the end walls, such as planar first end wall 116, has a heat conductive portion adapted to conduct heat between an outer surface of the end wall 116 and an inner surface of the end wall adjacent the exchanger 106 enclosed chamber.

The invention contemplates two primary types of heat exchanger apparatus.

The first, illustrated by exchanger 106, is adapted to be located centrally within a room so that both the first end wall 116 and the second end wall 118 are exposed to the interior of the hatchery chamber 12 as shown in FIG. 2. Exchanger 106 includes a second end wall heat conductive portion, in addition to the first, to conduct heat from an outer surface of the second end wall to an inner surface. In the preferred embodiment shown in FIG. 3, end walls 116, 118 are formed from 21 gauge sheets of copper. Copper is preferred for its high heat conductivity although it is understood that other materials having similar properties can be used. As will be explained in more detail below, the copper end walls 116, 118 are exposed to the interior of the hatchery chamber, thus causing the copper end walls to heat up and transfer the heat to air flowed past the inner surface within the exchanger chamber. To help facilitate the transfer, the air control unit 24 fans, such as fan 60 in FIG. 2, are activated to flow air from the hatchery chamber (heated by the embryos in racks 32) along the outer surfaces of end walls 116, 118.

The second type of heat exchanger apparatus contemplated by the invention, shown by exchanger 152, is adapted to be located against a wall, such as wall 22 (FIG. 2), of the hatchery chamber 12 so that only the first end wall of exchanger 152 is exposed to the interior of the hatchery chamber. The first end wall would then have a heat conductive portion, such as a copper sheet, that has a higher heat conductivity than the second wall, whereby the second wall can be formed of a sheet-like material such as aluminum or fiberglass. Although exchanger 152 can be retrofitted into existing hatchery chambers, such as by placing it against wall 16 in FIG. 2, it is understood that the exchanger can be integrated into the hatchery chamber wall during the construction process. A second wall-type exchanger (not shown) can be used on an opposing wall of the hatchery chamber to the first wall-type exchanger to increase the heat removal capacity of the entire system.

Figure 4:
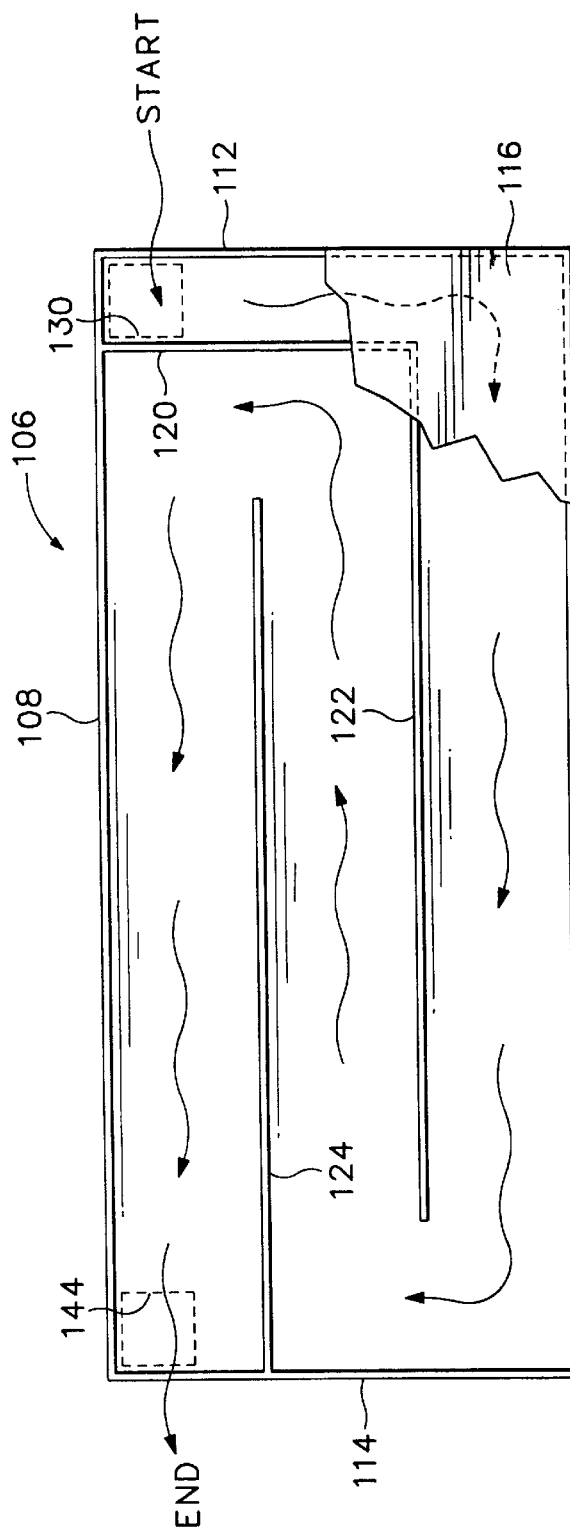
FIG. 4 is an elevation view of the center-mounted panel of FIG. 3 shown partially in section.

Turning to FIGS. 3 and 4, exchanger 106 includes a plurality of baffles, such as baffles 120, 122, 124, that span between first and second end walls 116, 118 and define a serpentine path within the chamber through which air is intended to flow from a start position of the path to an end position. As will be appreciated, air flowed in this way through the exchanger will be heated as it flows along the serpentine path (shown by the arrows in FIG. 4) so that the temperature of air exhausted from the exchanger is greater than air input to the exchanger. In this way, heat generated by live embryos within the hatchery chamber 12 can be transferred through the end wall copper sheets to air flowing through the exchanger and out into the atmosphere or to a different location that needs to be heated.

Air is input to the path start position of the exchanger via a hose assembly, such as flexible hose 126, which extends up through the top wall 18 of the hatchery chamber. An input duct 128 is coupled between hose 126 and the interior of the exchanger chamber, as through a cutout portion 130 formed in the first end wall 116.

Figure 8:
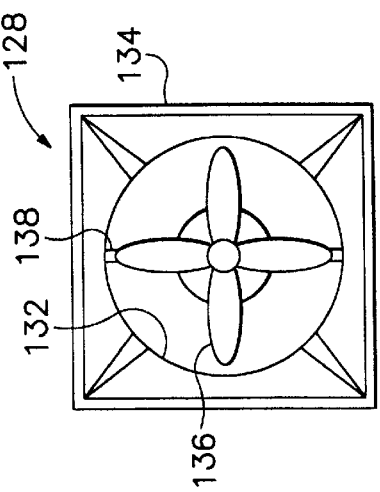
FIG. 8 is a front elevation view of the air intake duct of FIG. 7.
Figure 7:
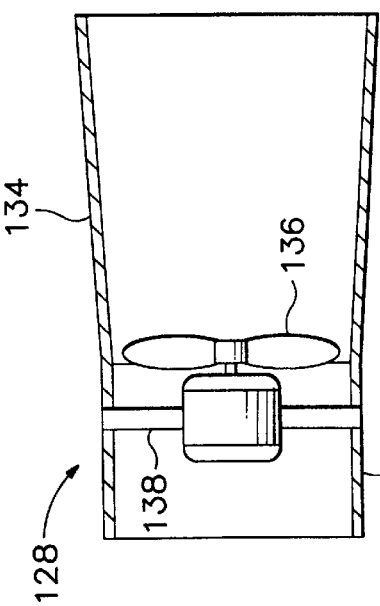
FIG. 7 is a partial section, side elevation view of the air intake duct used in the units of FIGS. 3 and 5.

An exemplary input duct is shown in FIGS. 7 and 8. Input duct 128 includes an annular neck portion 132 (adapted to be coupled to hose 126) and a squared interface portion 134 (adapted to be coupled to cutout 130). A fan 136 is mounted within the interior of the duct via support structures 138. When operated, as via control means and methods set forth in the '619 patent and incorporated herein by reference, the fan draws air down through flexible tube 126, into the exchanger chamber, through the serpentine path, and out through an exhaust duct 140. As with input duct 128, exhaust duct 140 is coupled between a hose, such as flexible hose 142, and the interior of the exchanger chamber, as through a second cutout portion 144 also formed in the first end wall 116.

An exemplary exhaust duct is shown in FIGS. 9 and 10 at 140. Exhaust duct 140 includes an annular neck portion 146 (adapted to be coupled to hose 142) and a squared interface portion 148 (adapted to be coupled to cutout 144). A motor-powered damper 150 is mounted within exhaust duct 140 in the usual manner. A motor (not shown) is drivable to set damper 150 between a first position, which shuts off air flow through the exhaust duct 140, and a second position which substantially completely opens the vent pipe. Damper 150 is illustrated between its first position and its second position.

Control of the damper is synchronized with control of fan 136 via such means as in the '619 patent. Briefly, damper 150 is opened and fan 136 is simultaneously activated to draw air through the center-mounted unit (wall mounted unit) when an internal temperature sensor indicates that the temperature is higher than a preset optimum level. This forces air in a serpentine path around the baffles of the units so that contact with the heat conductive side panels is maximized over time to enhance the transfer of heat to the air which is then conducted out of the units and into the atmosphere.

Figure 5:
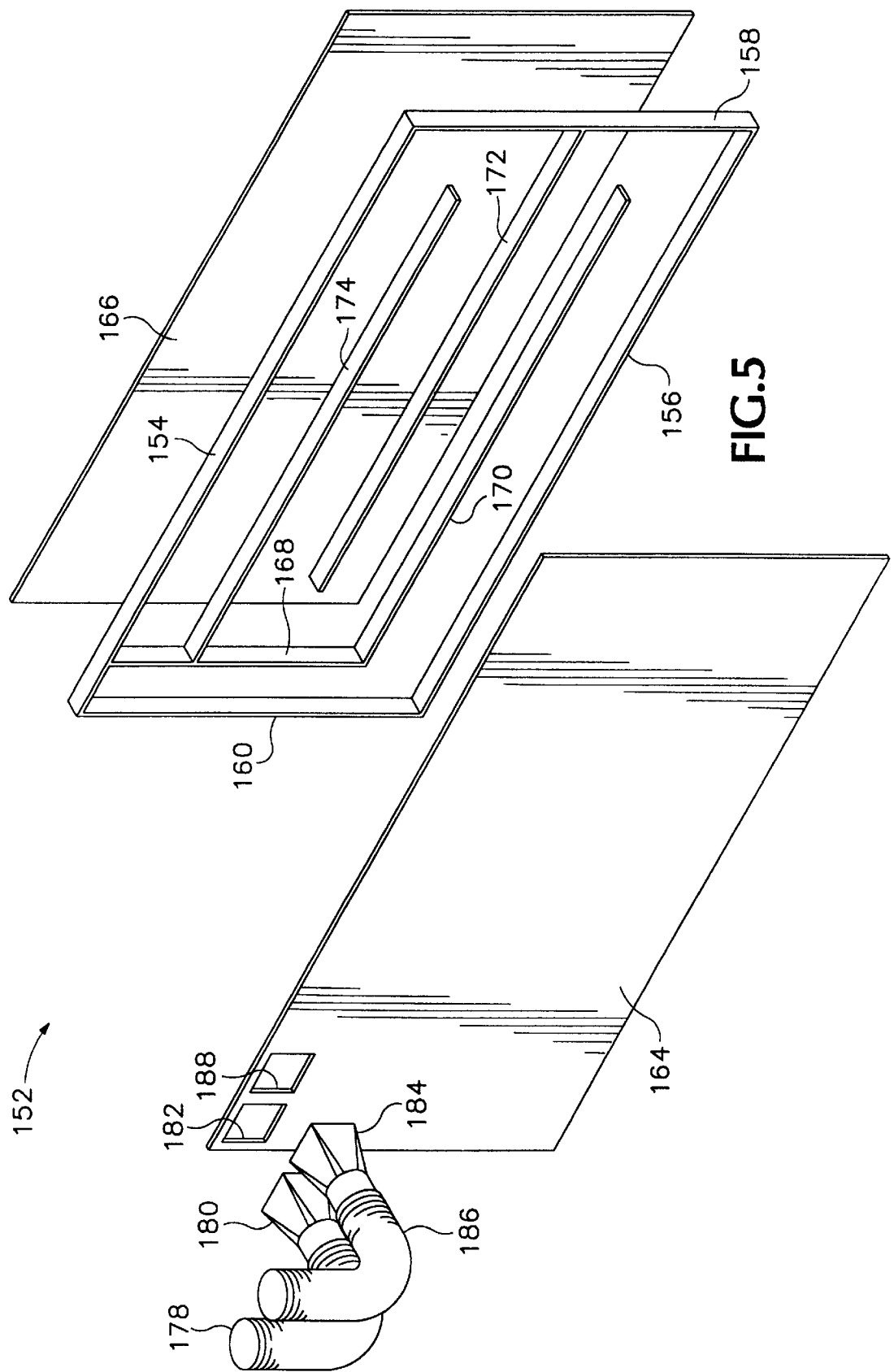
FIG. 5 is an exploded view of a wall-mounted heat removal and recovery unit constructed according to an alternate embodiment of the invention.

FIGS. 5 and 6 illustrate a wall-mounted exchanger 152. Exchanger 52 is similarly constructed to center-mounted exchanger 106 in that it comprises an enclosed chamber bounded by two pairs of opposing side walls, such as walls 154, 156, 158, 160, and an opposing first end wall 164 and second end wall 166. The first end wall 164, an exterior surface of which is exposed to the hatchery chamber as shown in FIG. 2, has a heat conductive portion (preferably a copper sheet such as with end walls 116, 118 of the center-mounted exchanger 106) that is adapted to conduct heat between an outer surface of the end wall 164 and an inner surface of the end wall adjacent the exchanger 152 enclosed chamber. As the second end wall 166 is not exposed to the interior of the hatchery chamber, but rather is flush with wall 22 of the hatchery, the second end wall 166 should be formed of a material that is more insulative than the first end wall. In this way, heat is not leaked out from the second end wall but rather is retained within the exchanger chamber until the heated air can be exhausted.

Exchanger 152 further includes a plurality of baffles, such as baffles 168, 170, 172, 174, that span between first and second end walls 164, 166 and define a serpentine path within the chamber through which air is intended to flow from a start position of the path to an end position. As will be appreciated, air flowed in this way trough the exchanger will be heated as it flows along the serpentine path (shown by the arrows in FIG. 6) so that the temperature of air exhausted from the exchanger is greater than air input to the exchanger. As with exchanger 106, heat generated by live embryos within the hatchery chamber 12 can be transferred through the end wall copper sheet to air flowing through the exchanger 152 and out into the atmosphere or to a different location that needs to be heated.

Air is input to and exhausted from the exchanger similar to the center-mounted exchanger described above. Namely, air is input to the path start position of the exchanger 152 via a hose assembly, such as flexible hose 178, which extends up through the top wall 18 of the hatchery chamber. An input duct 180 is coupled between hose 178 and the interior of the exchanger chamber, as through a cutout portion 182 formed in the first end wall 164. As with input duct 180, an exhaust duct 184 is coupled between a hose, such as flexible hose 186, and the interior of the exchanger chamber, as through a second cutout portion 188 also formed in the first end wall 164. Input and exhaust ducts 180, 184 include a fan and damper, respectively, which operate identically with those described above.

The description is now directed to the method for incubating and hatching eggs according to a preferred embodiment of the invention. A plurality of eggs are placed within the insulated hatchery chamber, as in rack 32. An air flow chamber, such as exchanger 106, is placed within the hatchery chamber. The exchanger has an external surface and an internal surface and is substantially sealed to prevent air within the air flow chamber from mixing with air from the insulated chamber. In the preferred embodiment, this is accomplished by drawing air from outside the hatchery chamber through a flexible tube and exhausting it back out through the roof of the hatchery. An external surface of the air flow chamber, such as surface 164 of exchanger 164, is exposed to the insulated chamber. The external surface of the air flow chamber is heated by convection caused by living embryos within the insulated chamber. Fans, such as fan 60 of the air control unit 24, can be used to blow the heated air upward along the exposed surfaces of the air flow chamber. Heat is conducted from the external surface to the internal surface of the air flow chamber. Fresh air is communicated from outside the insulated chamber into the air flow chamber. The air within the air flow chamber is then flowed across the internal surface of the air flow chamber thereby heating up the air as it flows across the air flow chamber internal surface. The heated air is then exhausted from the air flow chamber after it has flowed across the internal surface of the air flow chamber. The now-heated exhaust air can be recycled by, for instance, directing it into a second chamber in need of heating.

It is desirable to maintain a hatchery chamber at around 99° F. Embryos within the chamber, either fertilized eggs or newly hatched chicks, give off heat which, in the enclosed environment, tends to heat the hatchery chamber above its desired temperature. Testing of the invention in a simulated hatchery environment indicates that air input at 70° F. with a flow volume of 140 cubic feet per minute (cfm) is exhausted from the exchanger at approximately 90° F. It has been found that static pressure within the air flow chamber is disadvantageous to the effectiveness of the invention. One method that has been found to reduce this pressure is to make the exhaust port larger than the input port by between about 10% to 50%, and most preferably about 20%. Another method for decreasing the static pressure is by reducing the number of passes. A test of two exchangers constructed according to the present invention, one with four passes (such as in exchanger 152) and one with eight passes, resulted in the former yielding the greater heat exchange efficiency.

Having described and illustrated the principles of the invention in a preferred embodiment thereof, it should be apparent that the invention can be modified in arrangement and detail without departing from such principles. I claim all modifications and variation coming within the spirit and scope of the following claims.

I claim:

1. An apparatus for removing heat caused by living embryos within an insulated enclosure comprising:
    an enclosed chamber bounded by two pairs of opposing side walls and opposing first and second end walls spanning the insulated enclosure, the first end wall having a heat conductive portion adapted to conduct heat between an outer surface of the end wall facing an interior of the insulated enclosure and an inner surface of the end wall adjacent the enclosed chamber;
    a plurality of baffles within the chamber defining a serpentine path within the chamber through which air is intended to flow from a start position along the path to an end position;
    a fresh air inlet coupled to the start position for communicating fresh air from outside the insulated enclosure into the chamber through the serpentine path; and
    an exhaust air outlet coupled to the end position for communicating air that has flowed through the serpentine path from the chamber and out of the insulated enclosure,
    wherein the outer surface of the first end wall is warmed by air within the insulated enclosure and conducted to the inner surface and air passing within the chamber along the serpentine path is heated by the inner surface of the end wall as it passes from the start position to the end position.

2. The apparatus of claim 1 wherein the second end wall includes a heat conductive portion adapted to conduct heat between an outer surface of the second end wall and an inner surface of the second end wall adjacent the enclosed chamber.

3. The apparatus of claim 1 wherein the first end wall is formed from a copper sheet.

4. The apparatus of claim 1, further including a fan coupled to the air inlet for drawing air into the air inlet.

5. The apparatus of claim 1 wherein said first end wall is formed of a material having a higher heat conductivity than the second end wall.

6. The apparatus of claim 1 wherein said first end wall is formed of a material having an identical head conductivity as the second wall.

7. An apparatus for removing heat caused by living embryos within a insulated enclosure comprising:
    an enclosed chamber;
    means for conducting heat from an exterior surface of the chamber to an interior surface of the chamber;
    a plurality of baffles within the chamber defining a serpentine path through which air is intended to flow in proximity to the heated interior surface of the chamber,
    a fresh air inlet for communicating fresh air from outside the insulated into the chamber through the serpentine path; and
    an exhaust air outlet for communicating air that has flowed through the serpentine path from the chamber and out of the insulated enclosure.

8. The apparatus of claim 7, the enclosed chamber further including opposed end walls, a first of said end walls being formed of a material that is more heat conductive than material forming the second of said end walls.

9. The apparatus of claim 7, the enclosed chamber further including opposed first and second end walls each being formed of a relatively heat conductive material.

10. The apparatus of claim 7 in which the baffles are arranged within the chamber to present between 3 and 4 passes.

11. The apparatus of claim 7, wherein the exhaust outlet is between about 10% and 50% larger than the air inlet.

12. The apparatus of claim 11, wherein the exhaust outlet is approximately 20% larger than the air inlet.

13. A method for incubating and hatching eggs comprising the steps of:

placing a plurality of eggs within a insulated chamber;

providing an air flow chamber having an external surface and an internal surface, said air flow chamber being substantially sealed to prevent air within the air flow chamber from mixing with air from the insulated chamber;

exposing an external surface of the air flow chamber to the insulated chamber;

heating the external surface of the air flow chamber by convection caused by living embryos within the insulated chamber;

conducting heat from the external surface to the internal surface of the air flow chamber;

communicating fresh air from outside the insulated chamber into the air flow chamber;

flowing air within the air flow chamber across the internal surface of the air flow chamber thereby heating up the air as it flows across the air flow chamber internal surface; and exhausting the heated air from the air flow chamber after it has flowed across the internal surface of the air flow chamber.

14. The method of claim 13 further including the step of conducting the heated air from the air flow chamber to a second insulated chamber so that heat from the insulated chamber is conducted to the second insulated chamber.

15. The method of claim 13 further including the step of;

defining a serpentine air flow path within the air flow chamber having a start point adjacent a position where fresh air is conducted into the air flow chamber, and an end point adjacent a position where heated air is exhausted from the air flow chamber; and passing air back and forth along the serpentine path through the air flow chamber from the start point to the end point.

* * * * *